United States Patent
Kobayashi

(10) Patent No.: US 8,427,720 B2
(45) Date of Patent: Apr. 23, 2013

(54) DOCUMENT FEEDER, IMAGE-SCANNING APPARATUS, AND IMAGE-FORMING APPARATUS

(75) Inventor: Ken Kobayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 440 days.

(21) Appl. No.: 12/778,489

(22) Filed: May 12, 2010

(65) Prior Publication Data

US 2011/0013240 A1 Jan. 20, 2011

(30) Foreign Application Priority Data

Jul. 17, 2009 (JP) ................................ 2009-168761

(51) Int. Cl.
*H04N 1/04* (2006.01)
*H04N 1/46* (2006.01)
(52) U.S. Cl.
USPC ............ 358/498; 358/488; 358/496; 358/505
(58) Field of Classification Search .......................... None
See application file for complete search history.

(56) References Cited

U.S. PATENT DOCUMENTS

2009/0073512 A1* 3/2009 Kobayashi et al. ........... 358/498

FOREIGN PATENT DOCUMENTS

| JP | A-2003-134309 | 5/2003 |
| JP | A-2009-67559 | 4/2009 |

* cited by examiner

*Primary Examiner* — Thierry Pham
(74) *Attorney, Agent, or Firm* — Oliff & Berridge, PLC

(57) ABSTRACT

A document feeder includes: a conveyance unit that separates one document from among documents placed on a document tray, and conveys the document; a first width-determining unit that determines a width of one of the documents; a second width-determining unit that determines a width of the conveyed document; a first length-determining unit that determines a length of one of the documents; a second length-determining unit that determines a length of the conveyed document; and a controller that if an inconsistency occurs between the width determined by the first width-determining unit and the width determined by the second width-determining unit, causes a display unit to display an operation guide including first content, and if an inconsistency occurs between the length determined by the first length-determining unit and the length determined by the second length-determining unit, causes the display unit to display an operation guide including second content.

3 Claims, 9 Drawing Sheets

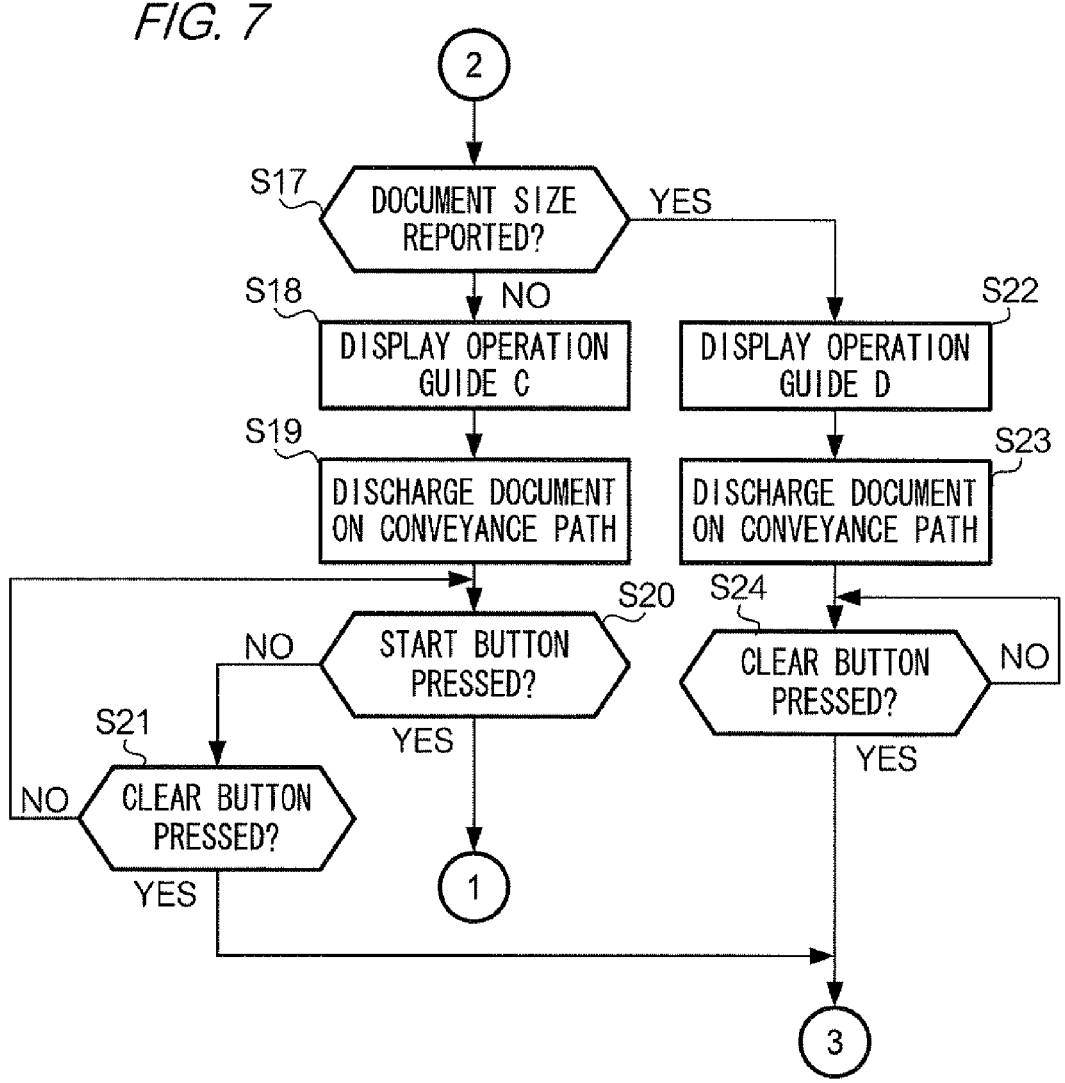

US 8,427,720 B2

DOCUMENT FEEDER, IMAGE-SCANNING APPARATUS, AND IMAGE-FORMING APPARATUS

CROSS-REFERENCE TO RELATED APPLICATIONS

This application is based on and claims priority under 35 USC 119 from Japanese Patent Application No. 2009-168761 filed on Jul. 17, 2009.

BACKGROUND

Technical Field

The present invention relates to a document feeder, an image-scanning apparatus, and an image-forming apparatus.

SUMMARY

An aspect of the present invention provides a document feeder including: a document tray on which documents are placed; a conveyance unit that separates one document from among the documents placed on the document tray, and conveys the document; a first document-width-determining unit that determines a document width of one of the documents placed on the document tray; a second document-width-determining unit that determines a document width of the document conveyed by the conveyance unit; a first document-length-determining unit that determines a document length of one of the documents placed on the document tray; a second document-length-determining unit that determines a document length of the document conveyed by the conveyance unit; a display unit that displays an operation guide to a user; and a controller that if an inconsistency occurs between the document width determined by the first document-width-determining unit and the document width determined by the second document-width-determining unit, causes the display unit to display an operation guide including first content, and if an inconsistency occurs between the document length determined by the first document-length-determining unit and the document length determined by the second document-length-determining unit, causes the display unit to display an operation guide including second content that is different from the first content.

BRIEF DESCRIPTION OF THE DRAWINGS

Exemplary embodiments of the present invention will now be described in detail below with reference to the following figures, wherein:

FIG. 7 is part 2 of a flowchart showing a procedure of an operation carried out in an image-scanning apparatus according to an exemplary embodiment of the present invention;

DETAILED DESCRIPTION

A specific exemplary embodiment of the present invention will be described below in detail with reference to the drawings. It is to be noted that the technical scope of the present invention is not limited to the exemplary embodiment described below, but may include a variety of modified or improved versions as long as they produce a specific effect obtained by an element or a combination of elements of the invention.

(Configuration of Image-Forming Apparatus According to Exemplary Embodiment of Present Invention)

Figure 1:
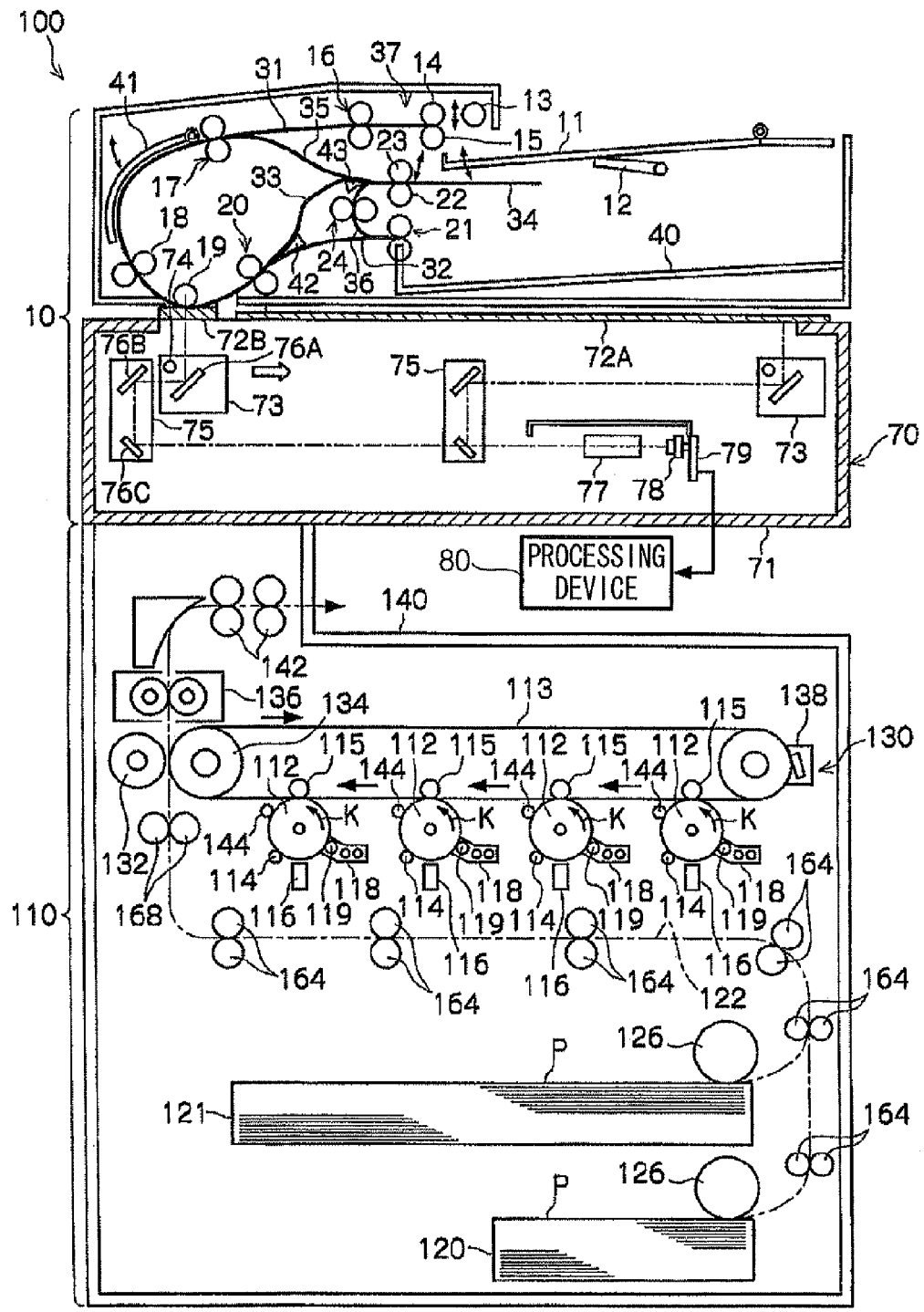
FIG. 1 is a schematic view of a configuration of an image-forming apparatus according to an exemplary embodiment of the present invention.

A configuration of an image-forming apparatus according to an exemplary embodiment of the present invention will now be described. FIG. 1 is a schematic view of a configuration of an image-forming apparatus according to an exemplary embodiment of the present invention.

Image-forming apparatus 100 includes image-forming device 110, which forms an image on recording medium P such as a sheet, and image-scanning apparatus 10, which feeds and scans a document. Image-scanning apparatus 10 is an example of a document feeder that feeds a document.

Image-scanning apparatus 10 is an upper part of image-forming apparatus 100, and image-forming device 110 is a lower part of image-forming apparatus 100.

Image-scanning apparatus 10 scans a document, and converts an image of the scanned document into an image signal. Image-forming device 110 forms an image on recording medium P on the basis of the image signal converted by image-scanning apparatus 10.

Now, a configuration of image-forming device 110 according to the present exemplary embodiment will be described.

Image-forming device 110 according to the present exemplary embodiment includes plural recording medium supplying units 120 and 121 in the lower part of the apparatus, as shown in FIG. 1.

Recording medium supplying units 120 and 121 store recording media P whose sizes differ between the supplying units. For example, recording medium supplying unit 120 stores recording media P of B5 size, and recording medium supplying unit 121 stores recording media P of B4 size.

Supply roll 126 is located immediately above an end (the right end in FIG. 1) each of recording medium supplying units 120 and 121. Supply roll 126 rotates while contacting an upper end of recording medium P, thereby sending recording medium P from recording medium supplying unit 120 or 121.

In image-forming device 110, there is provided conveyance path 122, which extends from an end each of recording medium supplying units 120 and 121 to the upper part of image-forming device 110, and has an S-shaped curvature.

Along conveyance path 122, there are provided plural (e.g., six) sets of conveyance rolls 164 and one pair of registration rolls 168, which hold and convey recording medium P. Conveyance rolls 164 are provided upstream in the recording medium conveyance direction relative to registration rolls 168.

Image-forming unit 130 is provided above recording medium supplying unit 121, and forms an image on recording medium P.

Recording medium P stored in recording medium supplying unit 120 or 121 is fed by feed roll 126, and conveyed to image-forming unit 130 by conveyance rolls 164 and registration roll 168 through conveyance path 122.

Image-forming unit 130 forms a color image on recording medium P conveyed from recording medium supplying unit 120 or 121, using colors of cyan, magenta, yellow, and black.

In image-forming unit 130, four photosensitive drums 112 are arranged so that they are able to rotate in tandem. Photosensitive drums 112 are caused to rotate in a direction of arrow K by a drive part (not shown).

Below the lower left of each photosensitive drum 112, charging roller 114 is provided so that it contacts photosensitive drum 112. Charging roller 114 charges a surface of photosensitive drum 112 to a predetermined electric potential.

After being charged, each photosensitive drum 112 is exposed to light irradiated from exposing head 116 provided below each photosensitive drum 112. As a result, a latent image corresponding to an image signal converted by image-scanning apparatus 10 is formed on a surface of each photosensitive drum 112.

Developing roller 119 of developing unit 118 for each color holds toners of a particular color with a predetermined electrical charge. A latent image formed on a surface of each photosensitive drum 112 is developed to a toner image of a particular color by applying a developing bias to developing roller 119.

The toner image of a particular color formed on each of photosensitive drums 112 is transferred onto intermediate transfer belt 113, which is provided above photosensitive drums 112, by first transfer roller 115; as a result, a full-color toner image is formed on intermediate transfer belt 113.

Recording medium P sent from recording medium supplying unit 120 or 121 and conveyed by conveyance rolls 164 is sent to a nip section formed by second transfer roller 132 and intermediate transfer roller 134, at a predetermined time by registration roller 168, and the full-color toner image is transferred to recording medium P.

Recording medium P onto which the full-color toner image has been transferred is conveyed to fixing unit 136. Fixing unit 136 fixes the toner image on recording medium P using heat and pressure. Recording medium P on which the toner image has been fixed is discharged onto output tray 140 by discharging roller 142.

When transfer of the toner image as described above is carried out, not all of the toner forming the image is transferred to intermediate transfer belt 113 or recording medium P; rather, a part of the toner remains on photosensitive drums 112 and intermediate transfer belt 113 as residual toner. Residual toner remaining on photosensitive drums 112 is removed by cleaning rolls 144, while that remaining on intermediate transfer belt 113 is removed by cleaning device 138.

(Configuration of Image-Scanning Apparatus According to Exemplary Embodiment of Present Invention)

A configuration of an image-scanning apparatus according to an exemplary embodiment of the present invention will now be described with reference to FIGS. 2 to 4 in addition to FIG. 1.

Image-scanning apparatus 10 according to the present exemplary embodiment includes document tray 11, which is provided as an example of a platen on which a document is placed, and tray lifter 12 that moves document tray 11 up and down. On document tray 11, a single document or a number of documents may be placed. Also, on document tray 11, documents of an identical size or documents of different sizes may be placed.

Specifically, on document tray 11, documents of sizes different in at least one of a document length, which is a distance extending along document feeding direction A, and a document width, which is a distance extending along a direction perpendicular to document feeding direction A, may be placed.

Image-scanning apparatus 10 also includes conveyance unit 37 that separates documents placed on document tray 11 and conveys the documents one by one, scanning unit 70 that scans the document conveyed by conveyance unit 37, and processing device 80 that processes an image signal representing an image of the document scanned by scanning unit 70.

Conveyance unit 37 includes supply roll 13 that sends documents from document tray 11 elevated by tray lifter 12, feed roll 14 that conveys the documents sent downstream by supply roll 13, and separating roll 15 that separates the documents sent by supply roll 13.

Also, conveyance unit 37 includes first conveyance path 31 to which a document sent from document tray 11 is first conveyed. First conveyance path 31 includes take-away rolls 16 that convey a separated document to rolls located downstream, pre-registration rolls 17 that convey the document to rolls located further downstream, and form a loop, registration rolls 18 that after suspending rotation, restart rotation to provide the document to scanning unit 70 while carrying out registration adjustments, platen roll 19 that assists in conveyance of a document being scanned, and out-rolls 20 that convey a scanned document further downstream.

Also, first conveyance path 31 includes baffle 41 that moves around the point of support depending on whether a document conveyed has been bent to form a loop.

In the downstream side of out-rolls 20, second conveyance path 32 and third conveyance path 33 are provided. At the fork of second conveyance path 32 and third conveyance path 33, conveyance path switching gate 42 is provided, which switches a conveyance path between second conveyance path 32 and third conveyance path 33.

In the downstream side of second conveyance path 32, discharge tray 40 is provided, which is an example of a discharging unit onto which a scanned document is discharged. First discharging roll 21 that discharges a document onto discharge tray 40 is provided in second conveyance path 32.

In the downstream side of third conveyance path 33, fourth conveyance path 34 is provided, which enables switchback of a document that has passed third conveyance path 33.

In fourth conveyance path 34, inverter roll 22 and inverter pinch roll 23 are provided, which switch back a document.

Fourth conveyance path 34 is connected to first conveyance path 31 via fifth conveyance path 35 that leads a document to first conveyance path 31 after the document is subject to switchback.

Fourth conveyance path 34 is also connected to sixth conveyance path 36 that discharges a document onto discharge tray 40 after the document is subject to switchback. Sixth conveyance path 36 includes second discharging rolls 24 that convey a document to be turned over and discharged, to first discharging roll 21, and exit switching gate 43 that switches a conveyance path between fifth conveyance path 35 and sixth conveyance path 36.

Supply roll 13 is, at a standby time, lifted up and kept at a standby position, and when a document is conveyed, lowered to a nip position (document conveyance position) so that the roll conveys the top document placed on document tray 11.

Supply roll 13 and feed roll 14 convey a document when feed clutches (not shown) are engaged. Pre-registration rolls 17 cause an edge of a document to contact registration roll 18, rotation of which is at that time suspended, so as to cause the document to form a loop. When a loop is formed, registration rolls 18 begin to rotate to return an end of a document that has been caught between registration rolls 18 to a nip position. After the loop is formed, baffle 41 moves outward around its fulcrum so as not to prevent formation of the loop.

Take-away rolls 16 and pre-registration rolls 17 keep the loop of the document that is being scanned. Upon formation of the document loop, a timing of scanning is adjusted. Also, occurrence of skews resulting from conveyance of a document to be scanned is prevented; namely, an alignment capability is enhanced. Upon commencement of a scan of a document, registration rolls 18, start to rotate. Also, the document is pressed by platen roll 19 to second platen glass 72B, and the under surface of the document is scanned so that image data is generated.

Conveyance path switching gate 42, after either single or simultaneous double sided scanning of a document is complete, is switched so that the document that has passed out-rolls 20 is led to second conveyance path 32, and discharged onto discharge tray 40. If a document is subjected to a simultaneous double-sided scanning, conveyance path switching gate 42 is switched so that the document is led to third conveyance path 33, as a result of which the document is turned over. Inverter pinch roll 23, when a document is subjected to simultaneous double-sided scanning, is retracted so that a nip is opened, when a feed clutch (not shown) is in an off state, as a result of which the document is led to fourth conveyance path 34. Thereafter, inverter pinch roll 23 is moved to a nip position so that a document to be inverted by inverter roll 22 is led to pre-registration rolls 17. Also, inverter pinch roll 23 conveys a document to be inverted and discharged to second discharging rolls 24 of sixth conveyance path 36.

Scanning unit 70 is provided in the lower part of image-scanning apparatus 10. Scanning unit 70 optically scans a document conveyed by conveyance unit 37. Device frame 71 that constitutes a housing for scanning unit 70 includes first platen glass 72A on which a document to be scanned is statically placed, and second platen glass 72B through which light is transmitted for scanning of a document being conveyed.

Scanning unit 70 also includes full-rate carriage 73 that stands by under second platen glass 72B, and performs a scanning over the entire first platen glass 72A, half-rate carriage 75 that provides light obtained from full-rate carriage 73 to an imaging unit. Full-rate carriage 73 includes illuminating lump 74 that irradiates light to a document, and first mirror 76A that receives light reflected by a document. Half-rate carriage 75 includes second mirror 76B and third mirror 76C that lead light reflected by first mirror 76A to an imaging unit.

Scanning unit 70 also includes imaging lens 77 that optically reduces an optical image reflected by third mirror 76C, CCD (Charge Coupled Device) image sensor 78 that carries out photoelectric conversion of an optical image formed by imaging lens 77, and drive plate 79 on which CCD image sensor 78 is provided. An image signal obtained by CCD image sensor 78 is sent to processing device 80 via drive plate 79. Processing device 80 sends the image signal to exposing head 116.

In a case where a document that is placed on first platen glass 72A is scanned, full-rate carriage 73 and half-rate carriage 75 are caused to move in a scanning direction (a direction of the arrow). A ratio of moving distances of full-rate carriage 73 and half-rate carriage 75 are two to one. When the two carriages are caused to move, illuminating lump 74 of full-rate carriage 73 irradiates light to a surface of the document to be scanned, and light reflected by the document is led to imaging lens 77 via first mirror 76A, second mirror 76B, and third mirror 76C. The light led to imaging lens 77 is led to CCD image sensor 78 to form an image on a light-receiving surface of the CCD image sensor. CCD image sensor 78 is a one-dimensional sensor that simultaneously processes one line of the document. If scanning of one line, which extends in a line direction (the main scanning direction), is finished, full-rate carriage 73 is caused to move in a direction perpendicular to the main scanning direction (the vertical scanning direction), and a next line is scanned. Such scanning is carried out for the entire document.

Second platen glass 72B is, for example, a long transparent glass plate. A document conveyed by conveyance unit 37 passes over second platen glass 72B. When a document passes over second platen glass 72B, full-rate carriage 73 and half-rate carriage 75 halt at a position (far left) indicated by solid line of FIG. 1. If a document passes platen roll 19 of conveyance unit 37, and one line of the document is subjected to light irradiated from illuminating lump 74, the reflected light is led to imaging lens 77 via first mirror 76A, second mirror 76B, and third mirror 76C to form an image. The image is read by CCD image sensor 78, which is a one-dimensional sensor. After the image for one line, which extends in the main scanning direction, is simultaneously processed by CCD image sensor 78, the next line, which extends in the main scanning direction, of the document, which is being conveyed by conveyance unit 37, is scanned. After the entire document passes a scanning position on second platen glass 72B, scanning of the document in the vertical scanning direction is completed.

Image-scanning apparatus 10 according to the present exemplary embodiment employs the center registration in which conveyance of documents is carried out with reference to the center position (the center position of a document in the main scanning direction) of a direction (the main scanning direction) perpendicular to document feeding direction A, and scanning of the documents are performed. To realize the center registration, a pair of document guides 61 and 62 is provided on a surface of document tray 11 on which a document is placed, as a unit for centering a document in the main scanning direction.

The pair of document guides 61 and 62 is provided as an example of a positioning member that controls a position in the document width direction of a document placed on document tray 11. Of the two document guides, document guide 61 is arranged at a far side as viewed from a user operating image-forming apparatus 100, and document guide 62 is arranged at a near side as viewed from the same user. In the following description, document guide 61 may be referred to as far-side guide 61, and document guide 62 may be referred to as near-side guide 62.

Far-side guide 61 and near-side guide 62 are configured so that they are able to move in a direction (the depth direction or the document width direction) perpendicular to document feeding direction A along slide slot 65 formed in document tray 11.

Far-side guide 61 and near-side guide 62 controls a position in the main scanning direction of a document by being brought into contact with the ends in the width direction of the document so that the ends are aligned.

Far-side guide 61 and near-side guide 62 are respectively connected to rack 63 provided on the back side (inside document tray 11) of a surface of document tray 11 on which documents are placed. Rack 63 extending from far-side guide 61 and rack 63 extending from near-side guide 62 engage with pinion 64. By the action of rack 63 and pinion 64, far-side guide 61 and near-side guide 62 are caused to slide as the other guide is caused to slide. Also, a distance of a slide of one guide is controlled to be equal to that of the other guide. If far-side guide 61 and near-side guide 62 are arranged at an equal distance from the center (the center position) in the depth direction (if centering has been carried out), the center (the center position) of a distance between far-side guide 61 and near-side guide 62 does not change if the two guides are caused to slide.

Figure 3:
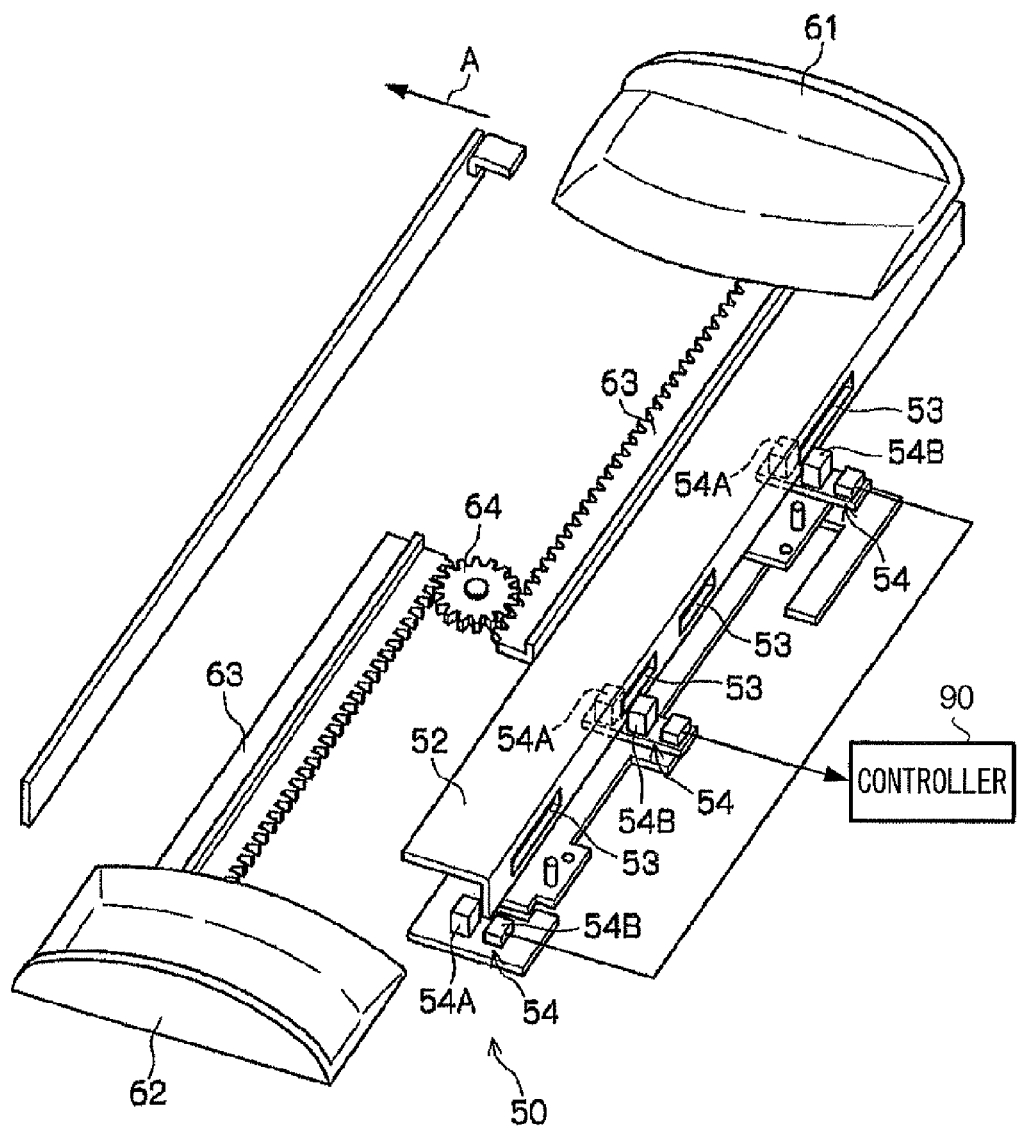
FIG. 3 is an oblique perspective figure showing a part of a configuration of a document feeder provided in an image-scanning apparatus according to an exemplary embodiment of the present invention.

Image-scanning apparatus 10 includes first document-width-determining sensor 50, as shown in FIG. 3, which is an example of a first document-width-determining unit that determines a width of a document placed on document tray 11. In a case where a number of documents of different sizes are placed on document tray 11, first document-width-determining sensor 50 determines a width of a document having a maximal width among the documents.

First document-width-determining sensor 50 includes movable body 52 that moves together with far-side guide 61 as the guide is caused to slide.

Movable body 52 is a bent plate having an L-shaped cross section, and is formed integral with rack 63 of far-side guide 61. Movable body 52 has plural openings 53. Openings 53 are arranged in a direction of movement (the longitudinal direction) of movable body 52.

First document-width-determining sensor 50 includes plural optical sensors 54 that are arranged along the longitudinal direction of movable body 52. The optical sensors are arranged so that movable body 52 with openings 53 moves in a space between light-emitting units 54A and light-receiving units 54B of optical sensors 54. If opening 53 of movable body 52 is located at a space between light-emitting unit 54A and light-receiving unit 54B, light irradiated from light-emitting unit 54A is received by light-receiving unit 54B. On the other hand, if opening 53 of movable body 52 is not located at a space between light-emitting unit 54A and light-receiving unit 54B, light irradiated from light-emitting unit 54A is not received by light-receiving unit 54B.

Namely, a document width of a number of documents placed on document tray 11 is determined on the basis of positions of openings of movable body 52 that moves together with far-side guide 61. In other words, a document width is determined with reference to a position of far-side guide 61.

In a case where documents having different widths are placed on document tray 11, far-side guide 61 and near-side guide 62 come into contact with an end of a document having the maximal width among the documents, and positioning by the two guides is completed. Accordingly, in this case, a document width determined on the basis of a position of far-side guide 61 is that of the document having the maximal width.

In the present exemplary embodiment, three optical sensors 54 are provided, and eight types of document widths can be determined.

It is to be noted that a first document-width-determining unit that determines a width of a document placed on document tray 11 may be a document-width-determining sensor that recognizes positions of far-side guide 61 and near-side guide 62 on the basis of an amount of rotation of pinion 64, thereby determining a document width of a document positioned by far-side guide 61 and near-side guide 62.

Alternatively, reflective sensors may be provided for determining directly a document width of a document positioned by far-side guide 61 and near-side guide 62 so that a width of a document having the maximal width placed on document tray 11 is determined.

Figure 2:
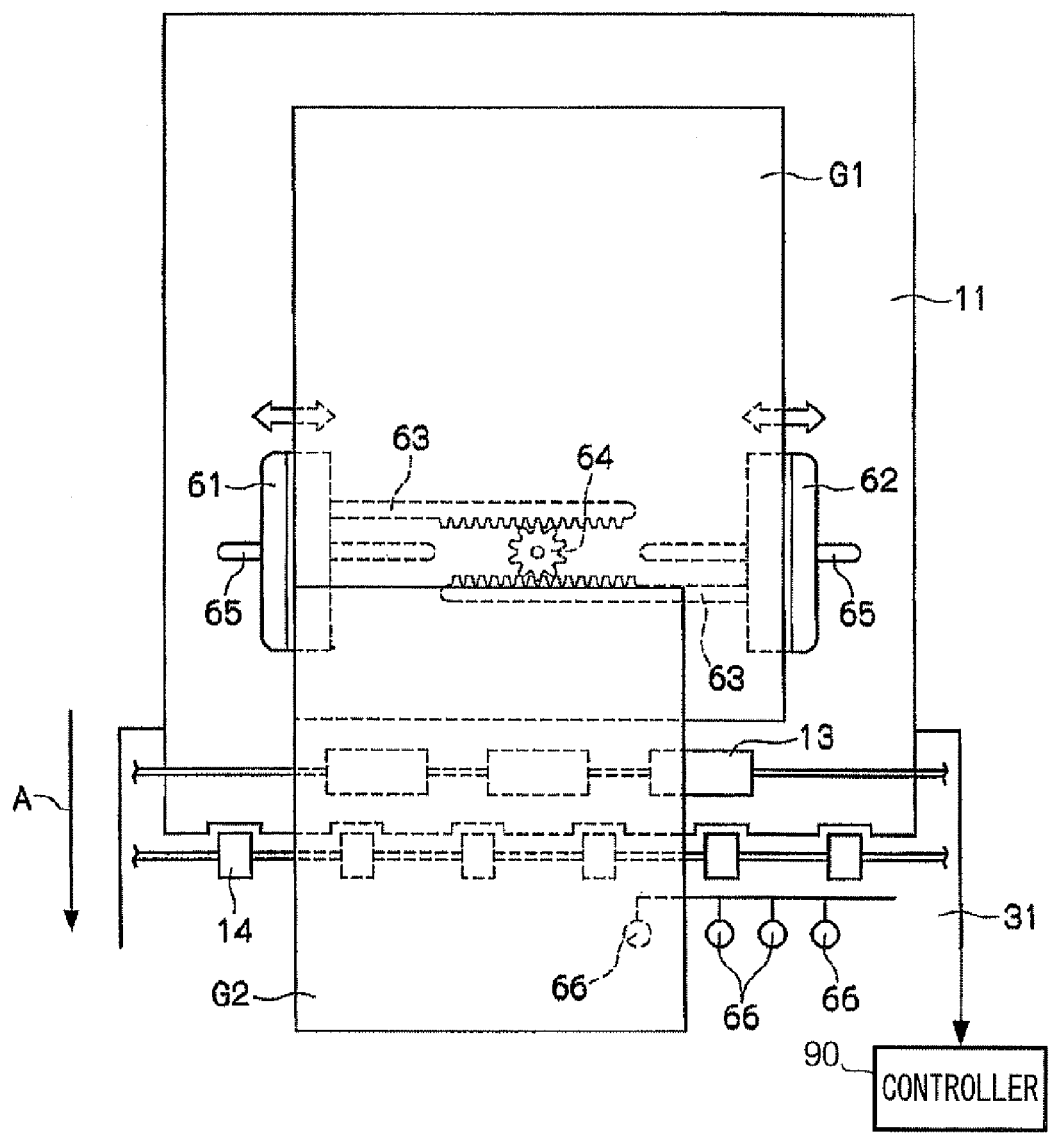
FIG. 2 is a plan view of a part of a configuration of a document feeder provided in an image-scanning apparatus according to an exemplary embodiment of the present invention.

In the present exemplary embodiment, second document-width-determining sensors 66 are provided near feed rolls 14 located downstream along first conveyance path 31, as shown in FIG. 2, which are examples of second document-width-determining unit that determines a document width of a document separated and conveyed by conveyance unit 37 from document tray 11.

Second document-width-determining sensors 66 are, for example, reflective sensors, and arranged apart so that different types of document widths (e.g., A/B series such as A4 (longitudinal), A4 (horizontal), A5 (horizontal), B4 (horizontal), or B5 (longitudinal), or inch-based sizes), which are widths of documents that are expected to be placed on document tray 11, can be determined.

For example, second document-width-determining sensors 66 may be arranged so that if one sensor turns ON, it is determined that a size of a document is B5, if two sensors turn ON, it is determined that a size of a document is A4, if three sensors turn ON, it is determined that a size of a document is B4, and if four sensors turn ON, it is determined that a size of a document is A3.

It is to be noted that in the example illustrated by FIG. 2, second document-width-determining sensors 66 are arranged on the assumption that a number of documents are placed such that their far-side edges are aligned with the feeding direction; however, second document-width-determining sensors 66 may be arranged such that a width of a document placed at the near side or the center in the width direction can be determined.

Figure 4:
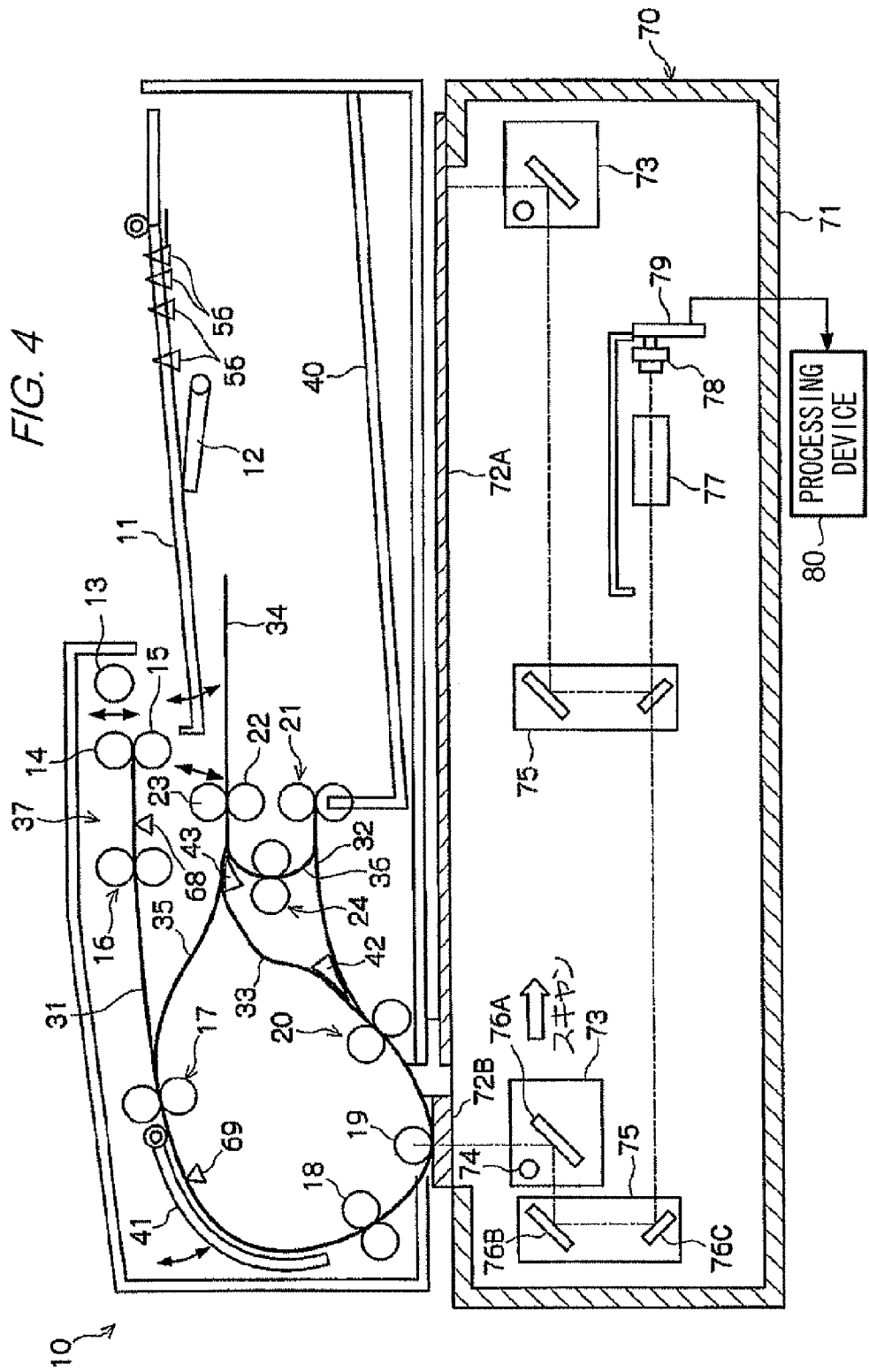
FIG. 4 is a schematic view of a configuration of an entire image-scanning apparatus according to an exemplary embodiment of the present invention.

In the present exemplary embodiment, first document-length-determining sensors 56 are also provided at document tray 11, as shown in FIG. 4; these are examples of first document-length-determining unit that determines a document length of a document placed on document tray 11.

First document-length-determining sensors 56 are, for example, reflective sensors. First document-length-determining sensors 56 are arranged in a spaced apart relation so that different types of document lengths (e.g., A/B series such as A4 (longitudinal), A4 (horizontal), A5 (horizontal), B4 (horizontal), or B5 (longitudinal), or inch-based sizes), which are lengths of documents that are expected to be placed on document tray 11, can be determined.

For example, first document-length-determining sensors 56 may be arranged so that if one sensor turns ON, it is determined that a size of a document is B5, if two sensors turn ON, it is determined that a size of a document is A4, if three sensors turn ON, it is determined that a size of a document is B4, and four sensors turn ON, it is determined that a size of a document is A3.

In the present exemplary embodiment, second document-length-determining sensors 68 and 69 are also provided along conveyance path 31, which are examples of a second document-length-determining unit that determines a document length of a document separated and conveyed by conveyance unit 37 from document tray 11.

Second document-length sensors 68 and 69 are, for example, reflective sensors. Second document-length-determining sensors 68 and 69 are arranged apart so that different types of document lengths (e.g., A/B series such as A4 (longitudinal), A4 (horizontal), A5 (horizontal), B4 (horizontal), or B5 (longitudinal), or inch-based sizes), which are lengths of documents expected to be placed on document tray 11, can be determined.

A length of a document is determined on a basis of whether second document-length-determining sensor 68 detects a document when second document-length-determining sensor 69 detects an end of the document.

First document-width-determining sensor, second document-width-determining sensors 66, first document-length-determining sensors 56, and second document-length-determining sensors 68 and 69 are connected to controller 90. Sensing signals (namely, document width data and document length data) of first document-width-determining sensor, second document-width-determining sensors 66, first document-length-determining sensors 56, and second document-length-determining sensors 68 and 69 are sent to controller 90.

Controller 90 controls driving of conveyance unit 37. Namely, controller 90 controls actions of rolls and gates included in conveyance unit 37.

Figure 5:
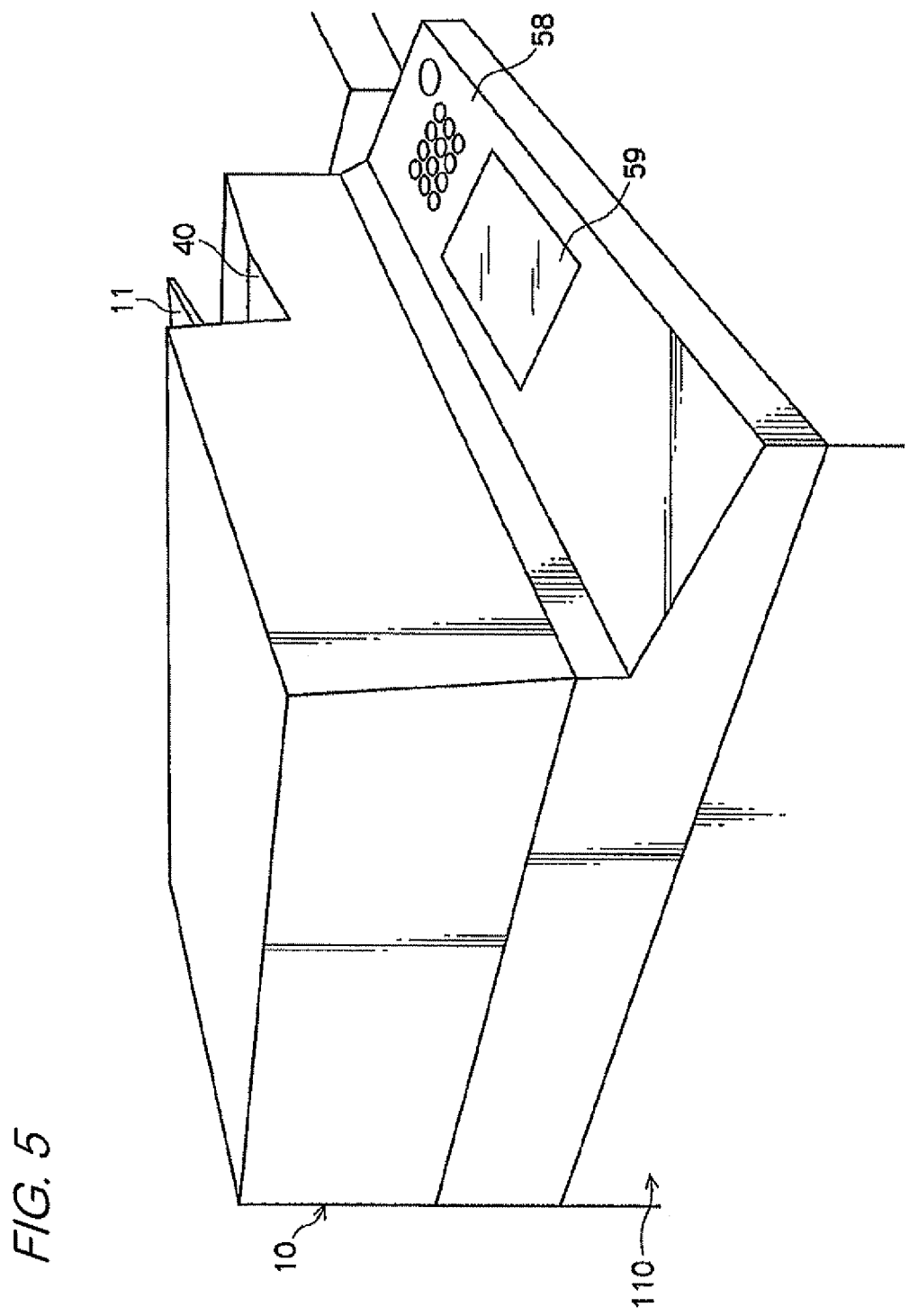
FIG. 5 is an oblique perspective figure showing an external appearance of an image-scanning apparatus according to an exemplary embodiment of the present invention.
Figure 6:
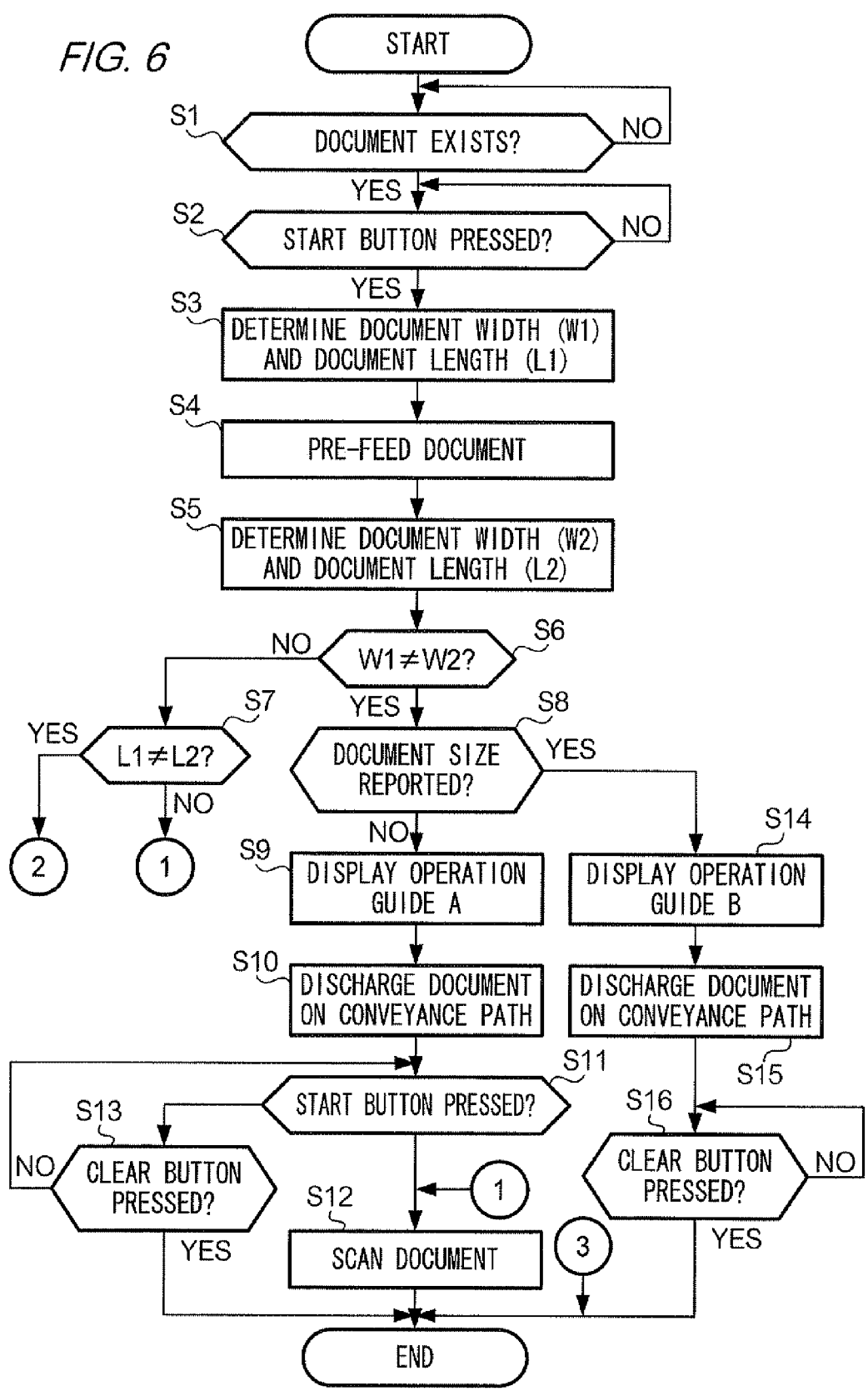
FIG. 6 is part 1 of a flowchart showing a procedure of an operation carried out in an image-scanning apparatus according to an exemplary embodiment of the present invention.

In the present exemplary embodiment, operation panel 58 is also provided at a surface of the case of image-scanning apparatus 10, as shown in FIG. 5, which is an example of an operation unit using which a user operates image-forming apparatus 100. Operation panel 58 includes a display panel 59, which is an example of a display unit that displays information for a user.

In the exemplary embodiment, image-scanning apparatus 10 has two operation modes: a mixed size mode in which conveyance of different size documents is allowed, and a normal mode in which conveyance of different size documents is not allowed. In the normal mode, conveyance of identical size documents only is allowed.

In the mixed size mode, if a number of documents of different sizes are placed on document tray 11, the documents are sequentially conveyed one by one, and each of the documents is scanned.

The mixed size mode may be selected by a user by use of operation panel 58. If the mixed size mode is selected, controller 90 carries out processing in accordance with the mixed size mode.

In the mixed size mode, second document-width-determining sensors 66 and second document-length-determining sensors 68 and 69 determine a size of each document when the document is conveyed to be scanned.

Document width data and document length data of a document are sent to image-forming device 110 via controller 90. Accordingly, for example, an image of a B5 document is copied onto recording medium P of a B5 size, and an image of B4 document is copied onto recording medium P of a B4 size.

(Procedure of Operation of Image-Scanning Apparatus According to Exemplary Embodiment of Present Invention)

Initially, controller 90 confirms whether a document exists on document tray 11 (step S1). Specifically, controller 90 can detect a presence of a document, using an actuator (not shown) whose position or attitude is changed in response to contact with an end of a document placed on document tray 11 by a user, and a sensor (not shown, hereinafter referred to as "document detection sensor") that turns ON or OFF depending on an action of the actuator. Controller 90 determines whether a document has been placed on document tray 11 on the basis of a sensing signal output from the document detection sensor.

Subsequently, controller 90 determines whether a start button provided at operation panel 58 has been pressed (step S2). If controller 90 determines that the start button has been pressed, controller 90 determines document width W1 of a document placed on document tray 11, using first document-width-determining sensor 50, and determines document length L1 of a document placed on document tray 11, using first document-length-determining sensor 56 (step S3). Specifically, controller 90 determines document width W1 of a document having a maximum width among documents placed on document tray 11, using first document-width-determining sensor 50, and determines document length L1 of a document having a maximum length among documents placed on document tray 11, using first document-length-determining sensor 56.

Subsequently, controller 90 carries out pre-feeding of the document by activating conveyance unit 37 (step S4). The pre-feeding of the document is carried out in accordance with the following procedure. Initially, documents placed on document tray 11 are sent to first conveyance path 31 by supply roll 13, and one of the documents is separated by feed roll 14 and separating roll 15 and sent to first conveyance path 31. As a result, the top document among documents placed on document tray 11 is sent to first conveyance path 31. Subsequently, the separated document is conveyed along first conveyance path 31 by take-away rolls 16 and pre-registration rolls 17, and an end of the document is struck to a nip portion of registration roll 18 so that the document is bent to form a loop. The foregoing is a pre-feeding operation. After the pre-feeding operation is completed, the document is suspended on first conveyance path 31 until registration rolls 18 are caused to rotate.

Controller 90 subsequently determines document width W2 of the document conveyed for the pre-feeding, using second document-width-determining sensors 66, and determines document length L2 of the same document, using second document-length-determining sensors 68 and 69 (step S5). Determination of document width W2 and document length L2 are carried out during pre-feeding. Also, determination of document width W2 is carried out prior to determination of document length L2.

Subsequently, controller 90 confirms whether document width W1 determined at step S3 and document width W2 determined at step S5 are different (step S6). A case where document widths W1 and W2 are different is a case where an inconsistency occurs between the document width of the document determined by first document-width-determining sensor 50 at step S3 and the document width of the document determined by second document-width-determining sensors 66 at step S5. On the other hand, a case where document widths W1 and W2 are not different (in other words, the document widths are identical) is a case where inconsistency does not occur between the document width of the document determined by first document-width-determining sensor 50 at step S3 and the document width of the document determined by second document-width-determining sensors 66 at step S5 (in other words, the document widths are consistent with each other).

In carrying out confirmation, if controller 90 determines that document widths W1 and W2 are not different (in other words, in a case where W1 is equal to W2), controller 90 confirms whether document length L1 determined at step S3 and document length L2 determined at step S5 are different (step S7). A case where document lengths L1 and L2 are different is a case where an inconsistency occurs between a document length of the document determined by first document-length-determining sensors 56 at step S3 and a document length of the document determined by second document-length-determining sensors 68 and 69 at step S5. On the other hand, a case where document lengths L1 and L2 are not different (in other words, the document lengths are identical) is a case where an inconsistency does not occur between the document length of the document determined by first document-length-determining sensors 56 at step S3 and the document length of the document determined by second document-length-determining sensors 68 and 69 at step S5 (in other words, the document lengths are consistent with each other).

(In a Case where Inconsistency Between Document Sizes does not Occur)

If controller 90 determines at step S6 that document widths W1 and W2 are not different, and determines at step S7 that document lengths L1 and L2 are not different, controller 90 proceeds to step S12 to carry out scanning of the documents. Scanning of the documents is carried out for each document sent to a scanning position (on second platen glass 72B) by registration rolls 18, by scanning unit 7.

(In a Case where Inconsistency Between Document Widths Occurs)

If controller 90 determines at step S6 that document widths W1 and W2 are different, the controller confirms whether a document size (document width and document length) has been notified to a main controller controlling operations of image-forming device 110 (step S8). If a document size is notified to the main controller, the main controller carries out assignment of pages to be recorded in recording media, on the basis of the notified document size. Accordingly, if a document size has not been notified to the main controller, it is not necessary to reset image-forming conditions such as a copy magnification; on the other hand, if a document size has been notified to the main controller, it is necessary to reset image-forming conditions to cancel assignment of pages made by the main controller.

Figure 8A:
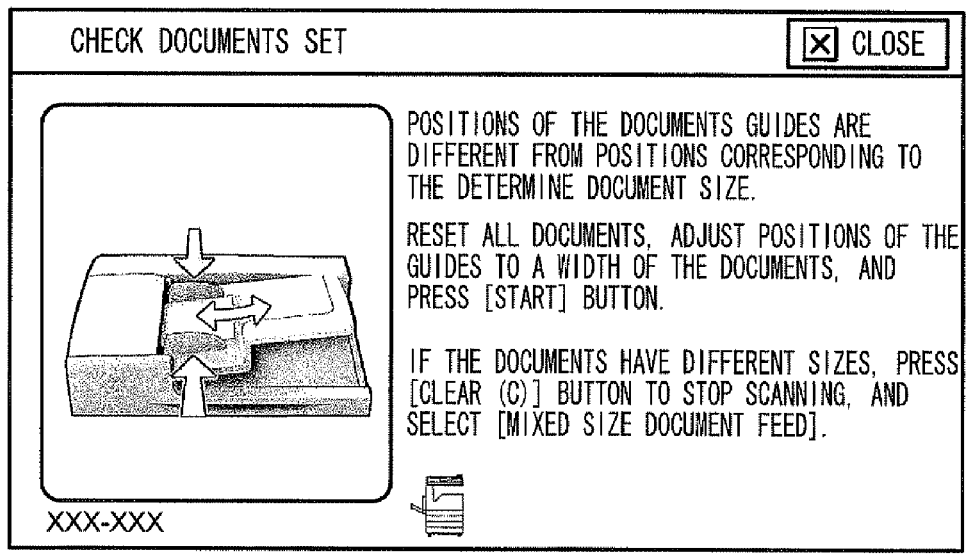
FIGS. 8A and 8B are diagrams showing an example of operation guidance that is displayed when an inconsistency occurs between two document widths.

If a document size has not been notified to the main controller, controller 90 causes display panel 59 to display a screen including operation guide A, as shown in FIG. 8A (step S9). Operation guide A is an example of an operation guide that instructs a user to adjust positions of document guides 61 and 62 to a width of a document, and is displayed on display panel 59. The screen including operation guide A also includes an image of an operation by which documents placed on document tray 11 are aligned, and positions of document guides 61 and 62 are adjusted to a width of the documents. The screen including operation guide A further includes a message "Positions of the documents guides are different from positions corresponding to the determined document size," a message "Reset all documents, adjust positions of the guides to a width of the documents, and press [start] button," and a message "If the documents have different sizes, press [clear (C)] button to stop scanning, and select [mixed size document feed]."

Subsequently, controller 90 activates conveyance unit 37 so that documents remaining on a conveyance path are discharged onto discharge tray 40 (step S10).

Subsequently, controller 90 determines whether a start button provided at operation panel 58 has been pressed (step S11). If controller 90 determines that the start button has been pressed, controller 90 carries out scanning of the documents (step S12). If the start button has not been pressed, controller 90 determines whether a clear button has been pressed (step S13). If the clear button has been pressed while the start button has not been pressed, controller 90 terminates the present operation. The clear button is provided at operation panel 58 together with the start button.

Figure 8B:
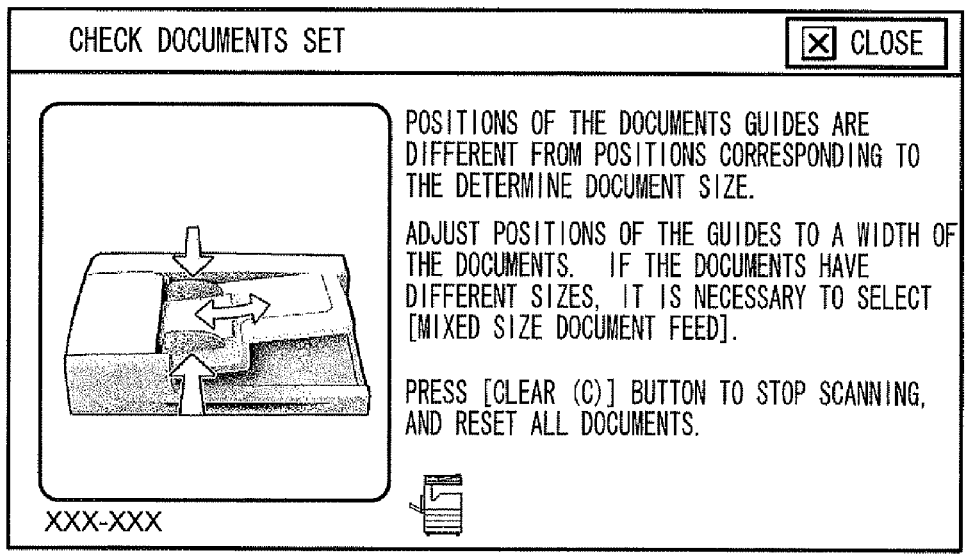

If a document size has been notified to the main controller, controller 90 causes display panel 59 to display a screen including operation guide B shown in FIG. 8B. Operation guide B is an example of an operation guide that instructs a user to adjust positions of document guides 61 and 62 to a width of a document, and is displayed on display panel 59. The screen including operation guide B also includes an image of an operation by which documents placed on document tray 11 are aligned, and positions of document guides 61 and 62 are adjusted to a width of the documents. The screen including operation guide B further includes a message "Positions of the documents guides are different from positions corresponding to the determined document size," a message "Adjust positions of the guides to a width of the documents. If the documents have different sizes, it is necessary to select [mixed size document feed]," and a message "Press [clear (C)] button to stop scanning, and reset all documents."

Subsequently, controller 90 activates conveyance unit 37 so that documents remaining on a conveyance path are discharged onto discharge tray 40 (step S15).

Subsequently, controller 90 determines whether the clear button has been pressed (step S16), and if the clear button has been pressed, the controller terminates the present operation.

(In a Case where Inconsistency Between Document Lengths Occurs)

Figure 9A:
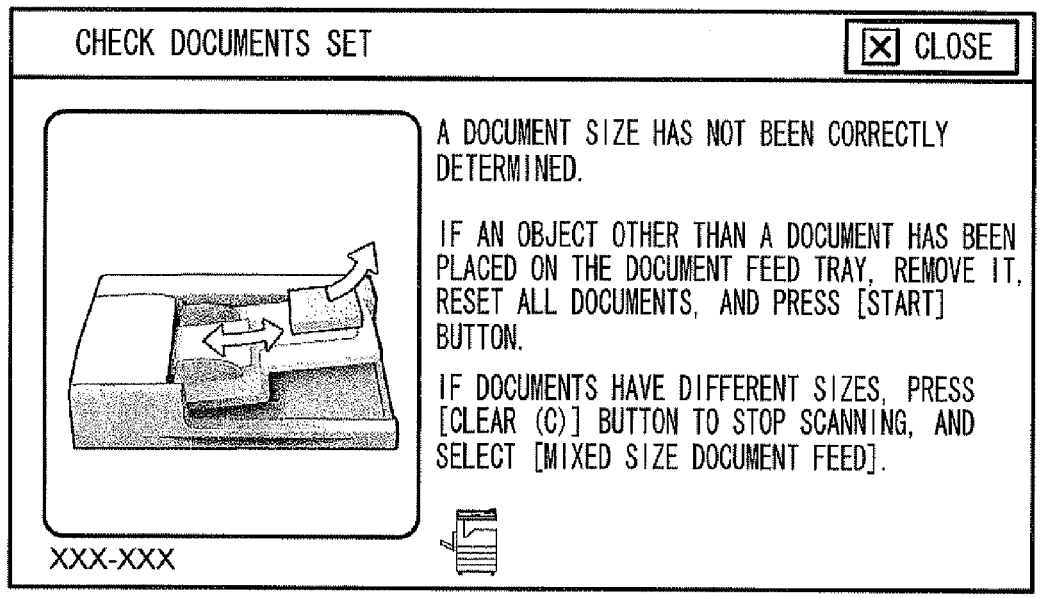
FIGS. 9A and 9B are diagrams showing an example of operation guidance that is displayed when an inconsistency occurs between two document lengths.

If controller 90 determines at step S7 that documents lengths L1 and L2 are different to each other, the controller confirms whether a document size (document width and document length) has been notified to the main controller controlling operations of image-forming device 110 (step S17). If a document size has not been notified, controller 90 causes display panel 59 to display a screen including operation guide C as shown in FIG. 9A (step S18). Operation guide C is an example of an operation guide that instructs a user to remove an object other than documents placed on document tray 11, and displayed on display panel 59. The screen including operation guide C also includes an image of an operation by which documents placed on document tray 11 are aligned, and an object other than documents is removed from document tray 11. The screen including operation guide C further includes a message "A document size has not been correctly determined," a message "If an object other than documents is placed on the document feed tray, remove it, reset all documents, and press [start] button," and a message "If documents have different sizes, press [clear (C)] button to stop scanning, and select [mixed size document feed]."

Subsequently, controller 90 activates conveyance unit 37 so that documents remaining on a conveyance path are discharged onto discharge tray 40 (step S19).

Subsequently, controller 90 determines whether the start button provided at operation panel 58 has been pressed (step S20). If controller 90 determines that the start button has been pressed, the controller proceeds to step S12 to carry out scanning of the documents. If controller 90 determines that the start button has not been pressed, the controller confirms whether the clear button has been pressed (step S21). If the clear button has been pressed while the start button has not been pressed, controller 90 terminates the present operation.

Figure 9B:
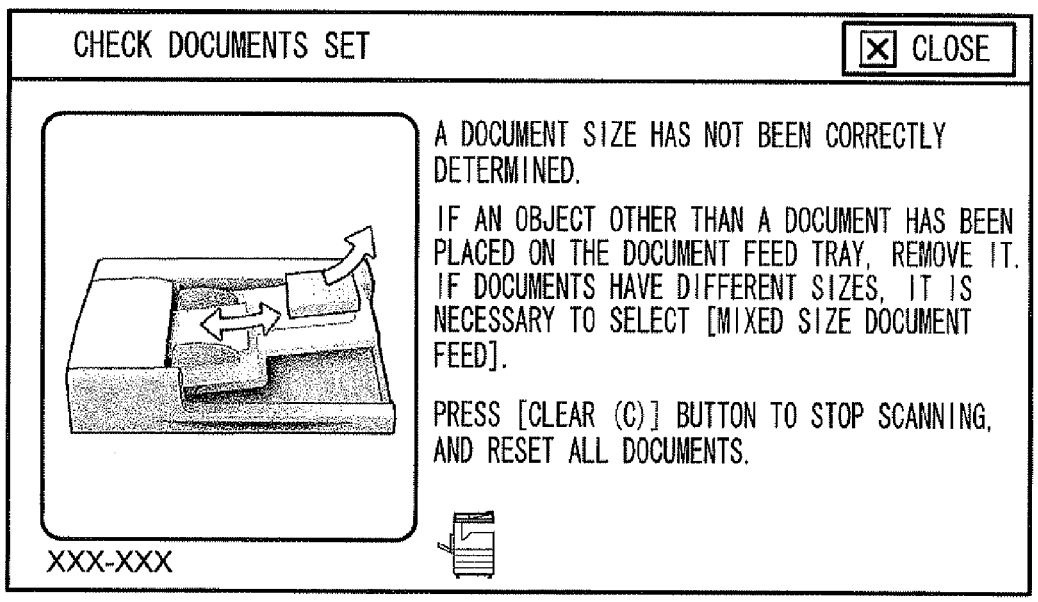

If a document size has been notified to the main controller, controller 90 causes display panel 59 to display a screen including operation guide D as shown in FIG. 9B (step S22). Operation guide D is an example of an operation guide that instructs a user to remove an object other than documents placed on document tray 11, and displayed on display panel 59. The screen including operation guide D also includes an image of an operation by which documents placed on document tray 11 are aligned, and an object other than documents is removed from document tray 11. The screen including operation guide D further includes a message "A document size has not been correctly determined," a message "If an object other than documents is placed on the document feed tray, remove it. If documents have different sizes, it is necessary to select [mixed size document feed]," and a message "Press [clear (C)] button to stop scanning, and reset all documents."

Subsequently, controller 90 activates conveyance unit 37 so that documents remaining on a conveyance path are discharged onto discharge tray 40 (step S23).

Subsequently, controller 90 determines whether the clear button has been pressed (step S24), and if the clear button has been pressed, the controller terminates the present operation.

In the foregoing operation procedure, if an inconsistency occurs between document width W1 determined by first document-width-determining sensor 50 and document width W2 determined by second document-width-determining sensors 66, controller 90 causes display panel 59 to display operation guide A or B (first content) that instructs a user to adjust positions of document guides 61 and 62 to a width of a document. Also, if inconsistency occurs between document length L1 determined by first document-length-determining sensors 56 and document length L2 determined by second document-length-determining sensors 68 and 69, controller 90 causes display panel 59 to display operation guide C or D (second content that is different from the first content) that instructs a user to remove an object other than documents placed on document tray 11.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document feeder comprising:
a document tray on which documents are placed;
a conveyance unit that separates one document from among the documents placed on the document tray, and conveys the document;
a first document-width-determining unit that determines a document width of one of the documents placed on the document tray;
a second document-width-determining unit that determines a document width of the document conveyed by the conveyance unit;
a first document-length-determining unit that determines a document length of one of the documents placed on the document tray;
a second document-length-determining unit that determines a document length of the document conveyed by the conveyance unit;
a display unit that displays an operation guide to a user;
a controller that if an inconsistency occurs between the document width determined by the first document-width-determining unit and the document width determined by the second document-width-determining unit, causes the display unit to display an operation guide including first content, and if an inconsistency occurs between the document length determined by the first document-length-determining unit and the document length determined by the second document-length-determining unit, causes the display unit to display an operation guide including second content that is different from the first content, and
a positioning member that controls a position in a document width direction of the documents placed on the document tray, wherein the controller, if an inconsistency occurs between the document width determined by the first document-width-determining unit and the document width determined by the second document-width-determining unit, causes the display unit to display an operation guide that instructs a user to adjust a position of the positioning member to the document width of the document that has been determined by the first document-width-determining unit;
wherein the controller, if an inconsistency occurs between the document length determined by the first document-length-determining unit and the document length determined by the second document-length-determining unit, causes the display unit to display an operation guide that instructs a user to remove an object other than documents, placed on the document tray.

2. An image-scanning apparatus comprising:
a document feeder that has:
   a document tray on which documents are placed;
   a conveyance unit that separates one document from among the documents placed on the document tray, and conveys the document;
   a first document-width-determining unit that determines a document width of one of the documents placed on the document tray;
   a second document-width-determining unit that determines a document width of the document conveyed by the conveyance unit;
   a first document-length-determining unit that determines a document length one of the documents placed on the document tray;
   a second document-length-determining unit that determines a document length of the document conveyed by the conveyance unit;
a display unit that displays an operation guide to a user;
a controller that if an inconsistency occurs between the document width determined by the first document-width-determining unit and the document width determined by the second document-width-determining unit, causes the display unit to display an operation guide including first content, and if an inconsistency occurs between the document length determined by the first document-length-determining unit and the document length determined by the second document-length-determining unit, causes the display unit to display an operation guide including second content that is different from the first content;
a scanning unit that scans the document conveyed by the conveyance unit; and
a positioning member that controls a position in a document width direction of the documents placed on the document tray, wherein the controller, if an inconsistency occurs between the document width determined by the first document-width-determining unit and the document width determined by the second document-width-determining unit, causes the display unit to display an operation guide that instructs a user to adjust a position of the positioning member to the document width of the document that has been determined by the first document-width-determining unit;

wherein the controller, if an inconsistency occurs between the document length determined by the first document-length-determining unit and the document length determined by the second document-length-determining unit, causes the display unit to display an operation guide that instructs a user to remove an object other than documents, placed on the document tray.

3. An image-forming apparatus comprising:

an image-scanning device that has:

a document feeder that includes:

a document tray on which documents are placed;

a conveyance unit that separates one document from among the documents placed on the document tray, and conveys the document;

a first document-width-determining unit that determines a document width of one of the documents placed on the document tray;

a second document-width-determining unit that determines a document width of the document conveyed by the conveyance unit;

a first document-length-determining unit that determines a document length one of the documents placed on the document tray;

a second document-length-determining unit that determines a document length of the document conveyed by the conveyance unit;

a display unit that displays an operation guide to a user;

a controller that if an inconsistency occurs between the document width determined by the first document-width-determining unit and the document width determined by the second document-width-determining unit, causes the display unit to display an operation guide including first content, and if an inconsistency occurs between the document length determined by the first document-length-determining unit and the document length determined by the second document-length-determining unit, causes the display unit to display an operation guide including second content that is different from the first content;

a scanning unit that scans the document conveyed by the conveyance unit;

an image-forming device that forms an image on a recording medium on the basis of an image scanned by the scanning unit; and a positioning member that controls a position in a document width direction of the documents placed on the document tray, wherein the controller, if an inconsistency occurs between the document width determined by the first document-width-determining unit and the document width determined by the second document-width-determining unit, causes the display unit to display an operation guide that instructs a user to adjust a position of the positioning member to the document width of the document that has been determined by the first document-width-determining unit;

wherein the controller, if an inconsistency occurs between the document length determined by the first document-length-determining unit and the document length determined by the second document-length-determining unit, causes the display unit to display an operation guide that instructs a user to remove an object other than documents, placed on the document tray.

* * * * *